United States Patent Office 3,319,654
Patented May 16, 1967

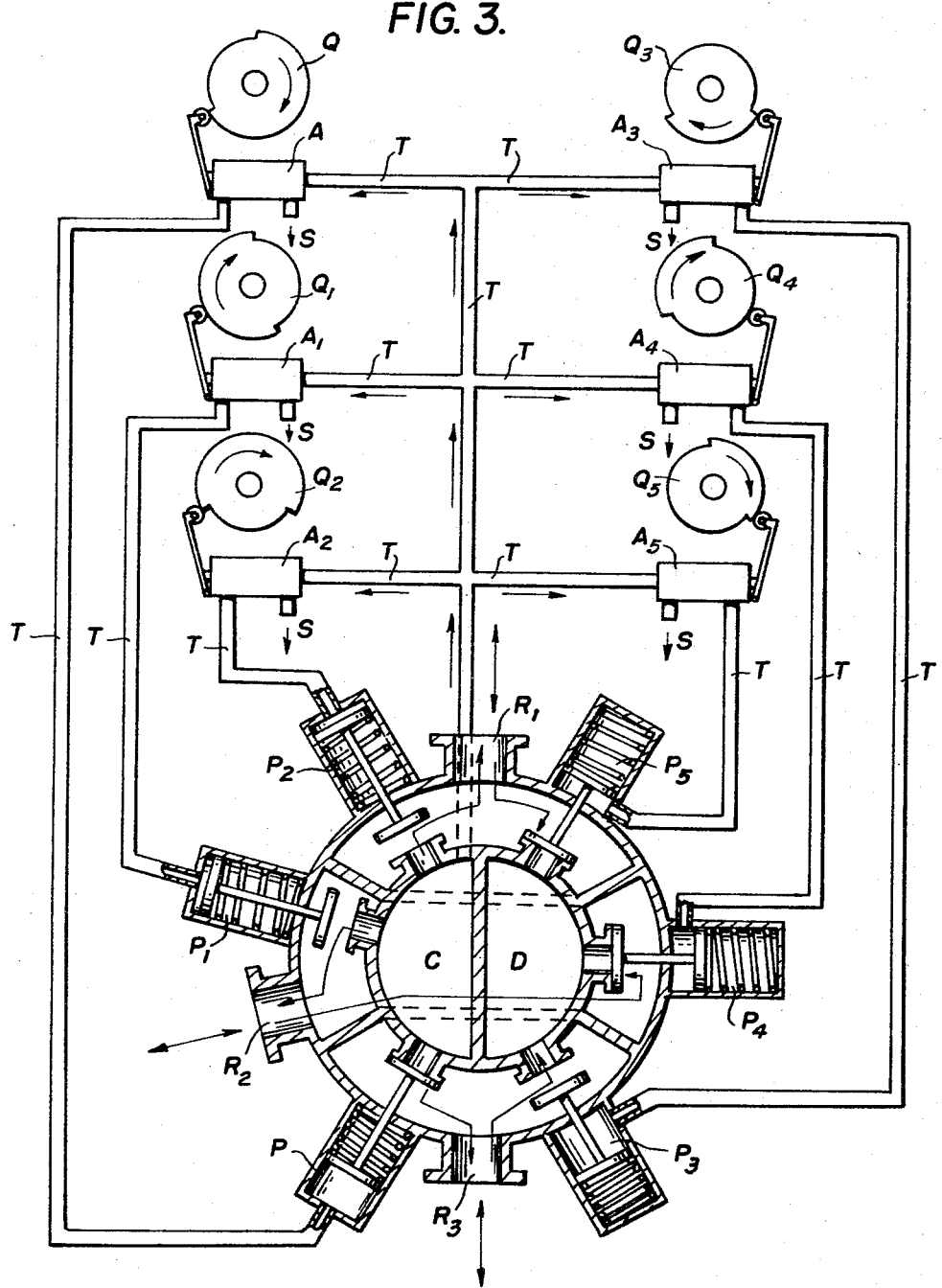

3,319,654
AIR DISTRIBUTOR FOR FLUID PUMPING PLANTS OPERATED BY COMPRESSED AIR
Giovanni Faldi, Via Forese Donati 27, Florence, Italy
Filed Jan. 20, 1964, Ser. No. 339,013
Claims priority, application Italy, Jan. 30, 1963, 682,245
3 Claims. (Cl. 137—624.13)

Various systems are known for distributing pulses of compressed air to apparatus operated thereby.

Generally conventional distributors, of rotary or reciprocating type, require a very accurate machining and assembly of the parts thereof, and nevertheless are affected by undesirable losses of compressed air. The existing distributors further are subject to the danger of seizure due to excessive heating of the closely fitting sliding members and due to deposits of dust or the like.

It is an object of the present invention to provide a distributor for supplying pulses of compressed air in a predetermined cyclical sequence to apparatus operated thereby, that avoids the above cited inconveniences and does not require any particularly accurate machining or assembling of the working parts thereof.

The present distributor is mainly characterized by the fact that the passage of compressed air between the source thereof (compressor or the like) and the apparatus to be operated thereby takes place through a main valve having a blocking member which seals an inlet port opening from a compressed air supply chamber and is actuated by a piston driven by compressed air derived from the same supply-chamber.

The members constituting the individual main valves, that is, the seats and blocking members, are preferably made of elastic material (rubber or the like) and, therefore they are not damaged by dust grains, sand or the like though ensuring in any case a very good seal. The supplying of compressed air to act on the pistons that actuate the main valves, is controlled by pilot valves which in turn are actuated by cams on a common cam shaft. The features of the invention will appear more clearly from the description that follows with reference to the embodiments illustrated by way of example in the accompanying drawings wherein:

FIG. 3 is a diagrammatic view of a distributor of still another embodiment of the invention.

Figure 1:
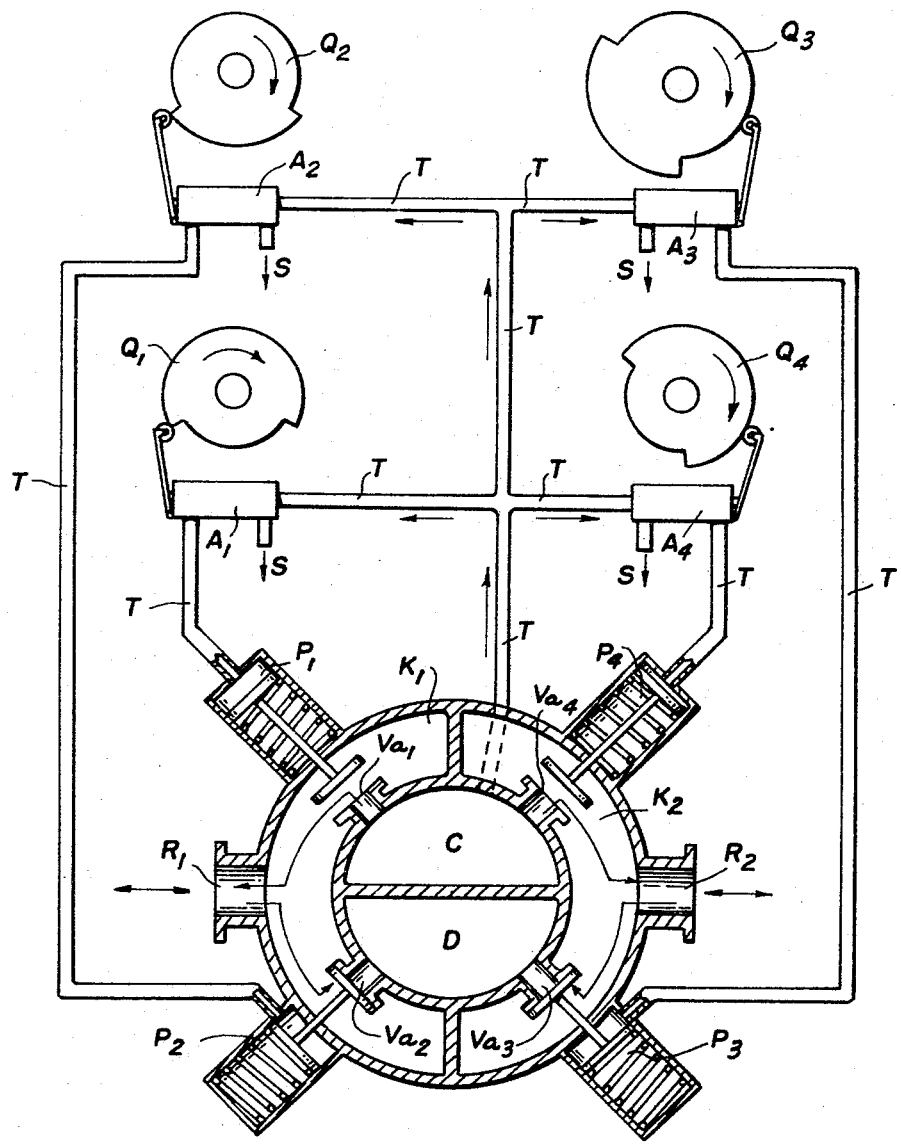
FIG. 1 is a diagrammatic view of a distributor in accordance with this invention which is capable of supplying pulses of compressed air in a cyclical sequence to two devices operable thereby.

With particular reference to FIG. 1, the distributor is there shown to comprise a housing divided into two control chambers $K_1$ and $K_2$, each of which is provided with a junction or opening $R_1$–$R_2$ for attaching the pipe (not shown) that establishes permanent communication with the corresponding pump body or other apparatus to be operated by compressed air pulses (not illustrated).

Each of chambers $K_1$ and $K_2$ is moreover provided with inlet and outlet valves $Va_1$ and $Va_2$ ($Va_3$ and $Va_4$) through which the control chamber is selectively communicated with a supply chamber C connected with the source of compressed air or with a waste chamber D opening to the atmosphere.

Each of the main valves $Va_1$–$Va_2$ has a blocking member directly connected to a piston $P_1$ ($P_2$–$P_3$–$P_4$) movable in one direction by compressed air and in the other direction by a return spring.

From the air supply chamber C there extends a network of small conduits T for supplying compressed air through commercially available pilot valves $A_1$, $A_2$, $A_3$, $A_4$ to the cylinders which contain the pistons $P_1$, $P_2$, $P_3$, $P_4$ respectively, said valves $A_1$, $A_2$, $A_3$, $A_4$ being controlled by respective cams $Q_1$, $Q_2$, $Q_3$, $Q_4$ which in turn are controlled by a single rotating shaft (not illustrated).

In the illustrated arrangement cam $Q_1$ is shown about to actuate valve $A_1$ so that compressed air will be applied to piston $P_1$ to close or seat inlet valve $Va_1$ of chamber $K_1$ while the cam $Q_4$, which controls valve $A_4$, has already vented the cylinder of piston $P_4$ so that the inlet valve $V_4$ of chamber $K_2$ has been opened with the prefixed advance. Piston $P_2$ whose movement is controlled by the valve $A_2$, is going to open outlet valve $Va_2$ of chamber $K_1$, while the piston $P_3$ whose movement is controlled by the valve $A_3$, has already closed outlet valve $Va_3$ when valve $Va_4$ has been opened. By the rotation of the cam shaft, the valves $A_1$, $A_2$, $A_3$, $A_4$ cyclically control the closing and opening of the valves $Va_1$, $Va_2$, $Va_3$, $Va_4$, in a predetermined sequence and for predetermined durations.

It should be noted that the area of each piston P against which there acts the compressed air drawn from conduits T, is larger than the area of the blocking member of the respective valve Va, thereby permitting the compressed air acting on each piston to easily overcome the counter-force resulting from the compressed air acting upon the valves. When high pressures of air are employed, the pilot valves $A_1$–$A_4$ employed for the control of the air for actuating pistons $P_1$–$P_4$ afford the advantage of permitting the use of a motor having very modest power for driving the cam shaft, while if the pistons were controlled directly by the cams the mechanical effort required for lifting or lowering them would be very high.

Figure 2:
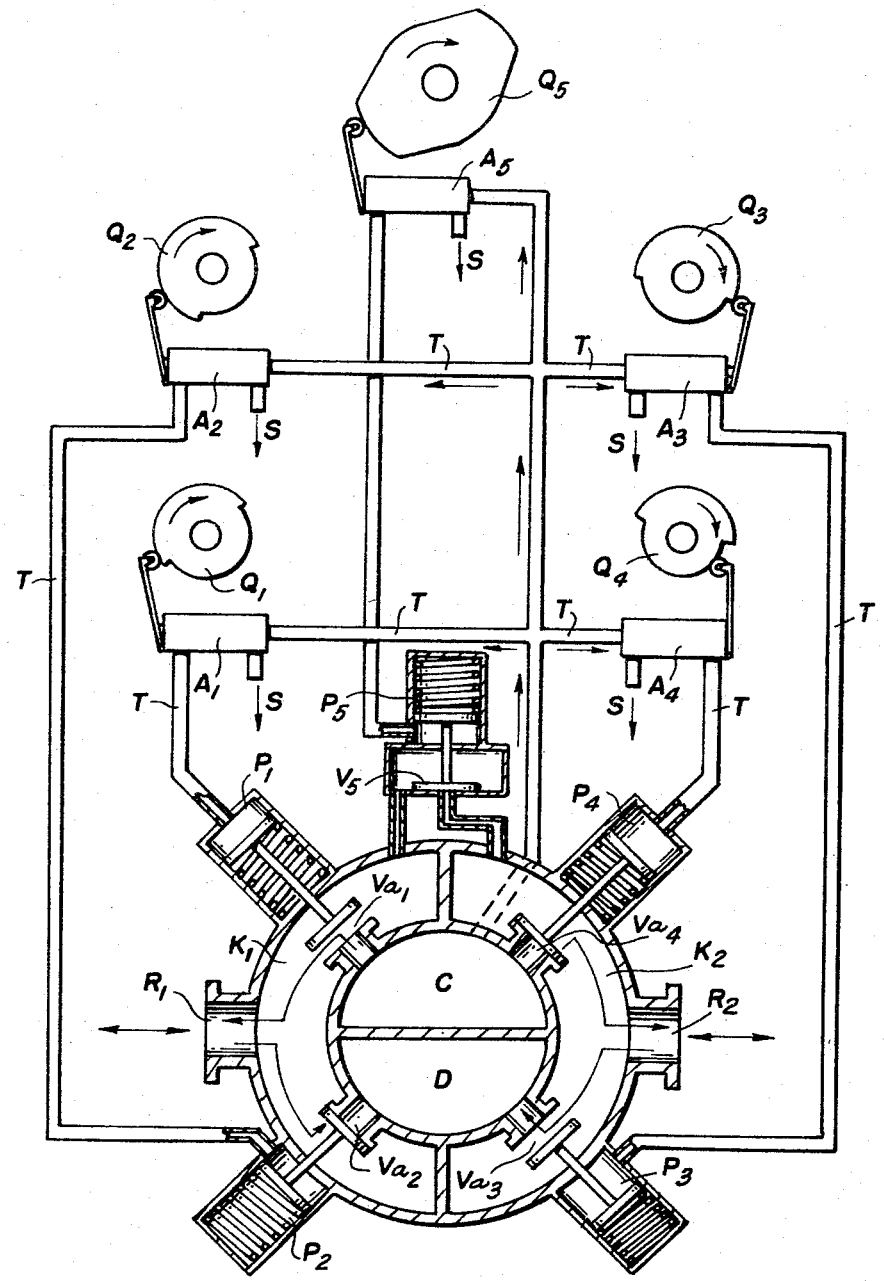
FIG. 2 is a diagrammatic view of a distributor, in accordance with another embodiment of this invention.

In the embodiment of FIG. 2 there is shown a distributor of the same type as in FIG. 1, but with the cams adjusted in such a way as not to give the advance in the admittance of air to the chambers $K_1$ and $K_2$ in sequence.

Instead there is provided another eccentric cam $Q_5$ which controls the passage of air through a valve $A_5$ to act upon the movement of a fifth piston $P_5$, which, in turn actuates a valve $V_5$ interposed in a by-pass conduit extending between the chambers $K_1$ and $K_2$. The valve $V_5$ is opened so that the compressed air, that has operated in one chamber is made to pass into the other chamber for the purpose of obtaining an equal pressure in the pipes extending from the two openings $R_1$ and $R_2$. Thus compressed air is transferred from one of chambers $K_1$ and $K_2$ to the other by way of a short circuit which increases the efficiency of the system, diminishing the air lost due to intervals between successive pulses.

In FIG. 2 the control chamber $K_1$ is shown at the end of the compression stage and the other chamber $K_2$ is at the discharge stage; this stage will be followed by the opening of the valve $V_5$ to permit air to pass from the chamber $K_1$ to the chamber $K_2$ after the closing of the outlet valve $Va_3$ of the latter.

Then, again under actuation by the cams, the chamber $K_1$ is open to discharge through its outlet valve $Va_2$ and the by-pass is blocked by closing of valve $V_5$ while compressed air is supplied to chamber $K_2$ through its open inlet valve $Va_4$.

In the diagram of FIG. 3 there is shown a distributor of the same kind for supplying compressed-air pulses in sequence to three devices operable thereby, wherein of course there are provided six pilot valves for controlling the movements of six pistons for operating the distribution valves.

Among the advantages of the present invention, the following should be noted:

(a) There are eliminated the considerable losses of compressed air which are encountered (and are very high specially at elevated pressures) with other types of distributors, in which the sealing is entrusted to metallic surfaces sliding over each other: pistons-jacket-etc. With the present distributor there is lost only the very modest quantity of compressed air fed through conduits T to the pilot valves and discharged, by the pilot valves after every operation.

(b) It does not require particularly accurate machining or close fitting of the parts as other types of distributors do and, therefore, it is not subject to the danger of seizure due to very small defects of machining or to heating.

Since the installations having distributors of these types are mainly employed for pumping to sandy waters, it is necessary, if using previously existing distributors to apply float valves or filters or at any rate devices to avoid any return (by lack of closure of a valve of the pump body) of sandy materials or dust through the distributor, which would thereby undergo seizure.

With the present distributor, especially if provided with piston operated blocking members of rubber acting upon rubber seats in each of the valves $Va_1$–$Va_4$, there can be avoided the necessity of all safety provisions, since the presence of water, of dust grains, of sand etc. does not damage it in the least. Moreover, it becomes possible to avoid the use of coolers for the compressed air as heating does not affect the working of the distributor.

I claim:

1. A distributor for cyclically supply pulses of compressed air from a source thereof to apparatus operable thereby; said distributor comprising a housing having means therein dividing said housing into a supply chamber adapted to be connected with the source of compressed air, a waste chamber opening to the atmosphere and at least two control chambers, each of said control chambers having inlet and outlet ports communicating with said supply and waste chambers, respectively, and an opening for communication with the apparatus to be operated by pulses of compressed air from the respective control chamber; main valve means for each of said ports including a blocking member movable to and from a seated position where it hermetically seals the respective port, a cylinder, and a piston reciprocable in said cylinder and being connected rigidly with said blocking member to move the latter to and from said seated position, said piston of each main valve means having an effective area subject to the action of compressed air in the respective cylinder which is greater than the area of the respective port; conduit means extending from said supply chamber to said cylinder of each of said main valve means; individual pilot valve means for each of said main valve means interposed in the respective conduit means and controlling the supplying of compressed air to said cylinder of the respective main valve means for action against said effective area of the piston therein; and cam means operating said pilot valve means to cause said blocking members for the inlet and outlet ports of said control chambers to move alternately to said seated positions thereof in a predetermined cyclical sequence.

2. A distributor according to claim 1; wherein said cam means is arranged to cause overlapping of the periods during which the blocking members for said inlet ports are moved away from said seated positions in said predetermined cyclical sequence.

3. A distributor according to claim 1; wherein said cam means is arranged to cause the blocking member for the inlet port of each control chamber to move to said seated position prior to the movement away from its seated position of the blocking member for the inlet port of the control chamber which is next in said predetermined cyclical sequence; and further comprising a by-pass conduit extending between said two control chambers, main valve means interposed in said by-pass conduit and including a blocking member movable to and from a seated position hermetically sealing said by-pass conduit, a cylinder and a piston reciprocable in said cylinder and being connected rigidly with the respective blocking member to move the latter to and from said seated position, conduit means extending from said supply chamber to said cylinder of the main valve means for the by-pass conduit, and pilot valve means interposed in the last mentioned conduit means and being operated by said cam means to cause said blocking member associated with the by-pass conduit to be moved away from its seated position for an interval prior to the movement to its seated position of the blocking member for the inlet port of each of said two control chambers.

References Cited by the Examiner
UNITED STATES PATENTS

| | | | |
|---|---|---|---|
| 2,376,918 | 5/1945 | Hughes | 137—596.14 |
| 3,134,395 | 5/1964 | Glasgow | 137—315 |
| 3,135,210 | 6/1964 | English | 103—49 |

ALAN COHAN, *Primary Examiner.*